(12) United States Patent
Petrovic (10) Patent No.: US 11,495,786 B2
(45) Date of Patent: Nov. 8, 2022

(54) INSERTED CAVITY ELECTRODE LITHIUM BATTERY

(71) Applicant: Slobodan Petrovic, Happy Valley, OR (US)

(72) Inventor: Slobodan Petrovic, Happy Valley, OR (US)

( * ) Notice: Subject to any disclaimer, the term of this patent is extended or adjusted under 35 U.S.C. 154(b) by 0 days.

(21) Appl. No.: 17/194,176

(22) Filed: Mar. 5, 2021

(65) Prior Publication Data

US 2021/0280850 A1 Sep. 9, 2021

Related U.S. Application Data

(60) Provisional application No. 62/986,685, filed on Mar. 7, 2020.

(51) Int. Cl.
*H01M 4/137* (2010.01)
*H01M 10/0525* (2010.01)
*H01M 4/02* (2006.01)

(52) U.S. Cl.
CPC ....... *H01M 4/137* (2013.01); *H01M 10/0525* (2013.01); *H01M 2004/024* (2013.01)

(58) Field of Classification Search
CPC combination set(s) only.
See application file for complete search history.

(56) References Cited

U.S. PATENT DOCUMENTS

| | | | |
|---|---|---|---|
| 3,116,170 A | 12/1963 | Williams | |
| 3,222,224 A | 12/1965 | Williams | |
| 3,793,060 A | 2/1974 | Weininger | |
| 5,750,289 A | 5/1998 | Kejha | |
| 6,143,445 A | 11/2000 | Ferment | |
| 6,251,540 B1 | 6/2001 | Kejha | |
| 8,865,345 B1* | 10/2014 | Ramasubramanian | H01M 4/386 429/163 |
| 2006/0032046 A1* | 2/2006 | Nathan | H01M 4/0438 29/623.5 |
| 2007/0212603 A1* | 9/2007 | Nathan | H01M 10/0436 429/149 |
| 2009/0136839 A1* | 5/2009 | Kraznov | H01M 6/186 429/160 |
| 2011/0076567 A1* | 3/2011 | Bouillon | H01M 10/0585 204/192.15 |
| 2011/0151317 A1* | 6/2011 | Giroud | H01B 1/122 429/162 |

(Continued)

OTHER PUBLICATIONS

Jun Liu, et al., "Pathways for practical high-energy long-cycling lithium metal batteries," Nature Energy, Mar. 2019, vol. 4, pp. 180-186, USA.

(Continued)

*Primary Examiner* — Amanda J Barrow
(74) *Attorney, Agent, or Firm* — Stephen Joncus (57) ABSTRACT

A battery with many cavities that form tiny reaction zones having voids. During charging, lithium metal forms in each cavity on the anode current collector. The formation of lithium metal in each of the many thousands of small cavities that are isolated from each other prevents the buildup of significant quantities of lithium metal in one location. The combination of tiny reaction zones and voids allows lithium metal to form without stressing the structure of the battery cell.

6 Claims, 9 Drawing Sheets

(56) References Cited

U.S. PATENT DOCUMENTS

| | | | | |
|---|---|---|---|---|
| 2013/0196201 | A1* | 8/2013 | Tyler | H01M 50/155 |
| | | | | 429/89 |
| 2015/0104678 | A1* | 4/2015 | Kwak | H01M 10/653 |
| | | | | 429/10 |
| 2017/0222205 | A1* | 8/2017 | Zhang | B29C 48/08 |
| 2018/0040913 | A1* | 2/2018 | Han | B32B 27/36 |
| 2018/0205113 | A1* | 7/2018 | Golodnitsky | H01M 10/058 |
| 2019/0198865 | A1* | 6/2019 | Kim | H01M 4/628 |
| 2019/0214674 | A1* | 7/2019 | Lim | H01M 10/0583 |
| 2019/0245239 | A1* | 8/2019 | Haverkate | H01M 4/045 |
| 2020/0044271 | A1* | 2/2020 | Kim | H01M 4/8657 |
| 2020/0058957 | A1* | 2/2020 | Kwon | H01M 12/08 |
| 2021/0082715 | A1* | 3/2021 | Rubloff | H01L 21/02636 |

OTHER PUBLICATIONS

Gregor Hoogers, "Fuel Cell Technology Handbook," 2003, Chap. 2, CRC Press, USA.

Matthew B. Pinson, "Theory of SEI Formation in Rechargeable Batteries: Capacity Fade, Accelerated Aging and Lifetime Prediction," J. Electrochem. Soc. 2013, vol. 160, Issue 2, Dec. 1, 2012, pp. A243-A250, USA.

* cited by examiner

INSERTED CAVITY ELECTRODE LITHIUM BATTERY

BACKGROUND

Batteries generate electrical energy from a chemical reaction. Many different types of batteries have been designed for different applications and different needs. Batteries made of different materials have distinct performance characteristics in terms of energy density (watts hours/liter), power density (watts/m$^3$), cycle life, safety, and cost.

A battery is a device having one or more electrochemical cells. The positive terminal of a battery is the cathode. The negative terminal, the anode, is the source of the electrons that flow through an external circuit powering the device connected to the battery and returning to the positive terminal. During discharge of a battery, a redox reaction occurs with the energy difference supplied to a circuit as electrical energy.

Batteries are ubiquitous. The world-wide market is larger than $100 billion per year and growing at approximately 8% per year, Lithium batteries are the focus of intense research because lithium is the lightest of all metals (the density of lithium metal density is only about half that of water) and has the most negative electrochemical potential (−3.05 V). Lithium batteries have other desirable characteristics. They typically discharge at a relatively constant voltage with little variation. Lithium batteries have a relatively long shelf-life with a low rate of self-discharge. Lithium batteries also have a high Coulombic efficiency most of a charge can be discharged to supply electric power.

The basic theory of a lithium battery involves the oxidation of lithium on the anode the negative electrode—during charging. During discharge of the battery, a lithium atom at the anode gives up an electron to the circuit and the resulting Li+ ion transports through the electrolyte from the anode to the cathode. The cathode is typically a layered or honeycombed structure that permits the Li+ ions to fill into the spaces, or intercalate, in the molecular structure of the cathode material. During charging of the battery, electrons are supplied to the negative terminal where, in the case of lithium metal batteries, they react with Li+ ions to form lithium metal.

There are two basic types of lithium batteries: lithium metal and lithium ion. Lithium metal and lithium ion are distinguished based on the nature of the anode active material.

Lithium batteries were first developed in the 1970's and commercialized in the 1980's. The first lithium batteries were lithium metal batteries with a lithium metal anode and a molybdenum sulfide cathode. A problem with these lithium metal batteries occurred during battery charging. As lithium metal collected on the anode during charging, it tended to form in sharp projections called dendrites. These lithium dendrites could grow and have the mechanical strength to puncture through the separator between the anode and cathode, causing a short circuit, heat generation, and potential fire.

These problems with the first lithium metal batteries caused them to be replaced by lithium ion batteries. Lithium ion batteries are the most commonly used type of lithium batteries today. In the case of lithium ion, the anode contains a structure that provides mechanical support that enables bonding of lithium in a charged state. Ideally, in a lithium ion battery, lithium is never reduced to its metallic state to prevent the formation of metallic dendrites. While several materials can be used in the anode of lithium ion batteries, the most important material is graphite. Graphite has a layered structure that permits lithium ion insertion in the matrix of carbon to carbon bonds. During discharge, lithium gives up an electron, detaches from the graphite of the anode, and travels as Li+ through the electrolyte to the cathode. Once reaching the cathode, the Li+ ion intercalates between the layers of a cathode material.

Another challenge with lithium batteries is the volumetric change of the anode during charging and discharge cycles. During repeated charging, when the lithium ions travel from the cathode to the anode to become lodged in graphite structure, the lattices of of graphite expand. The mechanical stress on the graphite structure from repeated expansion and contraction over time leads to facture and the development of defects. Over time the volume changes at the anode can cause a lithium metal battery failure. Similarly, in the case of a lithium metal battery, the anode swells with the buildup on lithium metal on the anode. One of the main challenges for new lithium battery designs is to accommodate this volumetric expansion at the anode in order to increase battery life.

SUMMARY

I have discovered a new lithium metal battery for storing electrical energy. The battery employs a plethora of small cavities formed in a non-conductive polymer base material. The anode has a series of concave wells formed through layers of material placed over the non-conductive polymer base material. The cathode material is also layered over the the non-conductive polymer base material, creating confined anodic and cathodic reaction zones within each cavity and creating a void at the anode to accommodate the accumulation of lithium metal. During charging lithium metal forms in each cavity on the anode current collector. The formation of lithium metal occurs in each of many thousands of small cavities that are isolated from the other cavities to prevent the buildup of significant quantities of lithium in one location. The isolation of lithium metal formation into a plethora of separate and discrete cavities confine the reactions to small reaction zones in each cavity to prevent the formation of damaging dendrites.

The design utilizing very thin layers of material in cavities also creates a void at the anode that accommodates the increase in volume that occurs at the anode when lithium metal is deposited. This permits lithium ions to deposit as lithium metal to fill the void without stressing the structure of the cell. The flexibility of the layers also permits the layers to flex as necessary to accommodate the plating of lithium metal on the anode. While charging, lithium collects as lithium metal on the anode, building up and filling the void between the current collector and the solid electrolyte. The reverse occurs during discharge as lithium ions transfer to the cathodic active mass, leaving a cavity at the anode and intercalating at in the cathode active mass. The thin layer structure permits the layers to breathe as lithium ions travel from the cathode to the anode and back again.

The stack design permits multiple cells to be constructed in series, or parallel, as desired to meet the power needs of a particular application. The stack design results in batteries formed in sheets. The sheets can be rolled or folded, as known in the art, to form battery packages.

The stack design using cavities creates a much larger surface area that has many times the surface area of a flat stack without cavities. The increase in surface area directly improves the energy density. Moreover, the resistance to lithium ion movement is lower as a result of the larger surface area, which improves the energy density of the stack.

DESCRIPTION

Figure 1A:
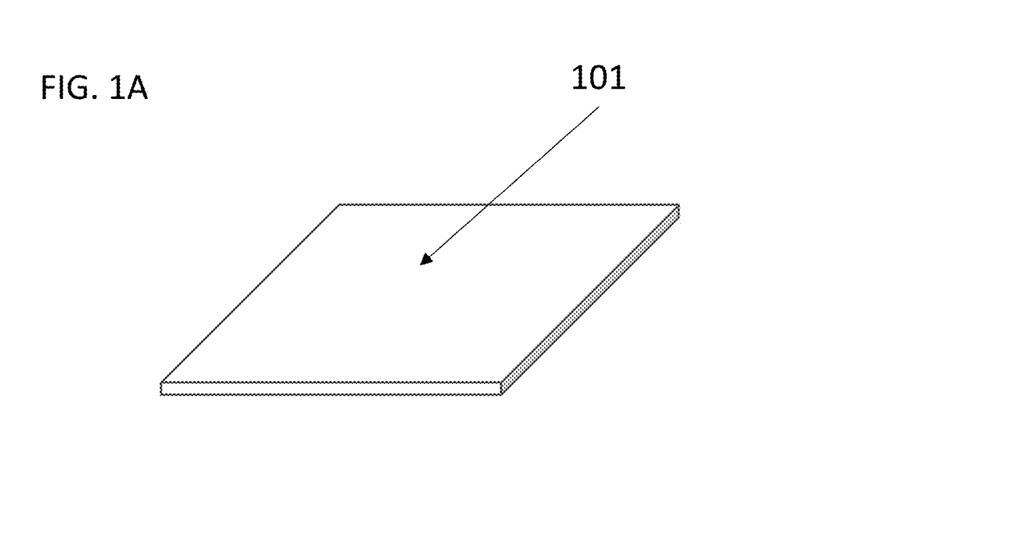
FIG. 1A is a 3D view of a polymer sheet.
Figure 1B:
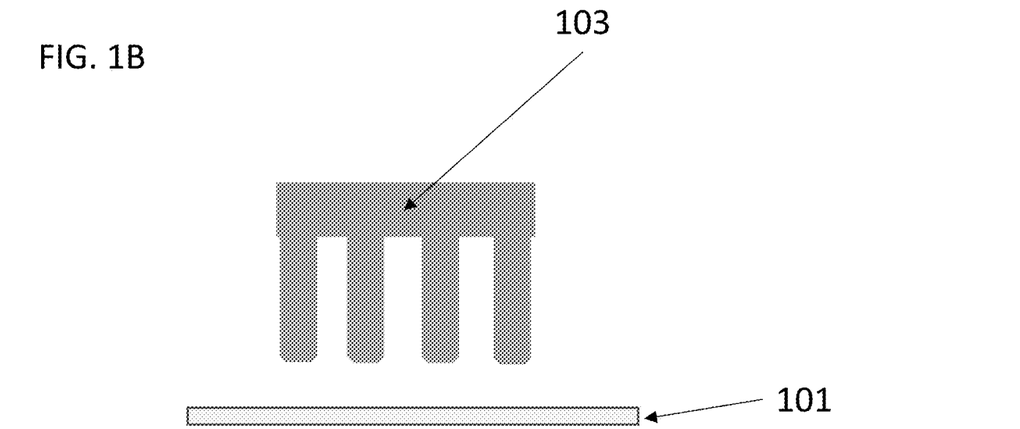
FIG. 1B is a side view of a polymer sheet with a die.
Figure 2A:
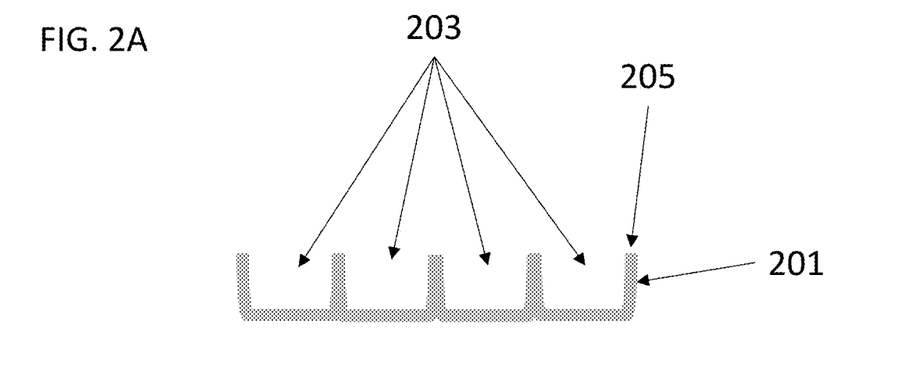
FIG. 2A is a cross section of a polymer base layer with cavities.
Figure 2B:
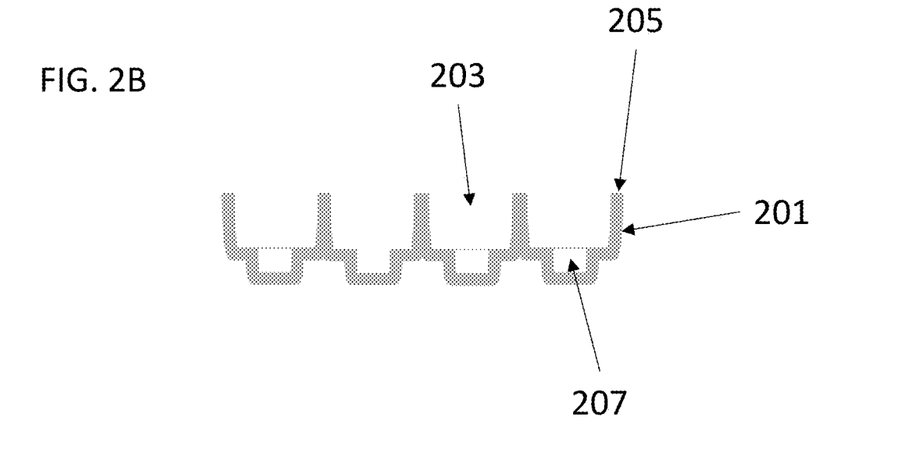
FIG. 2B is a cross section of another embodiment of a polymer base layer with cavities.
Figure 2C:
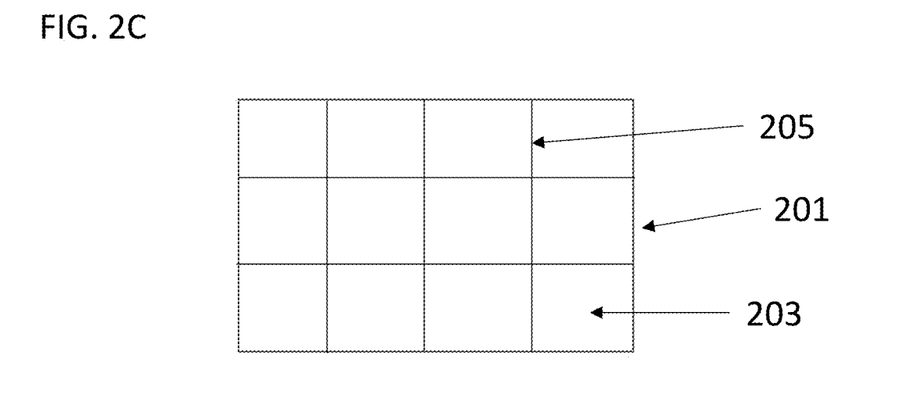
FIG. 2C is a top view of a polymer base layer with cavities.

The assembly of the new battery begins with a thin polymer sheet 101 as the base material, FIG. 1A. The thin polymer sheet may be made of, polyethylene, polypropylene, polytetrafluorethylene, polyvinyldene fluoride, polyethersulfone, or other similar materials. The thickness of the thin polymer sheet 101 may be 30 microns up to 1000 microns. To enhance the surface area of the thin polymer sheet 101, a die 103 is pressed into the thin polymer sheet 101 to deform it, FIG. 1B, forming a polymer base layer 201 with an array of cavities 203 which could also be called pores, dimples, depressions, or pockets as shown in FIG. 2A and FIG. 2B. The cavities 203 can be arranged in any manner such as in rows and columns or in a honeycomb fashion and have a square-like or round-like shapes depending on the desired pattern. The cavities 203 may be sized to be 1 to 300 microns deep and from 1 to 50 microns wide. If the pitch of a cavity 203 is 5 microns (e.g., a 4 micron wide cavity with a 1 micron wall) then there will be approximately 2,000 cavities 203 in a linear centimeter or about 4,000,000 cavities 203 in a square centimeter. If the pitch of a cavity 203 is 20 microns (e.g., a cavity 18 microns across with a wall that is 2 microns thick) then there will be approximately 500 cavities 203 in a linear centimeter or about 250,000 cavities 203 in a square centimeter.

For cavities about 18 microns and 100 microns deep the internal surface area of each cavity is approximately $8\times10^{-5}$ cm$^2$ and the volume of each cavity is approximately $3\times10^{-8}$ cm$^3$. For a square centimeter with 250,000 cavities, the internal surface area of the cavities is approximately 19 cm$^2$ and the internal volume of the 250,000 cavities in a square centimeter is $1\times10^{-2}$ cm$^3$. In this example, having deformed the polymer sheet 101 to form a base layer 201 with 250,000 cavities 203 in a square centimeter, increases the surface area nearly twenty times. The surface area of the cavity can be further enhanced with secondary recesses 207 created in the bottom of each cavity.

Figure 3:
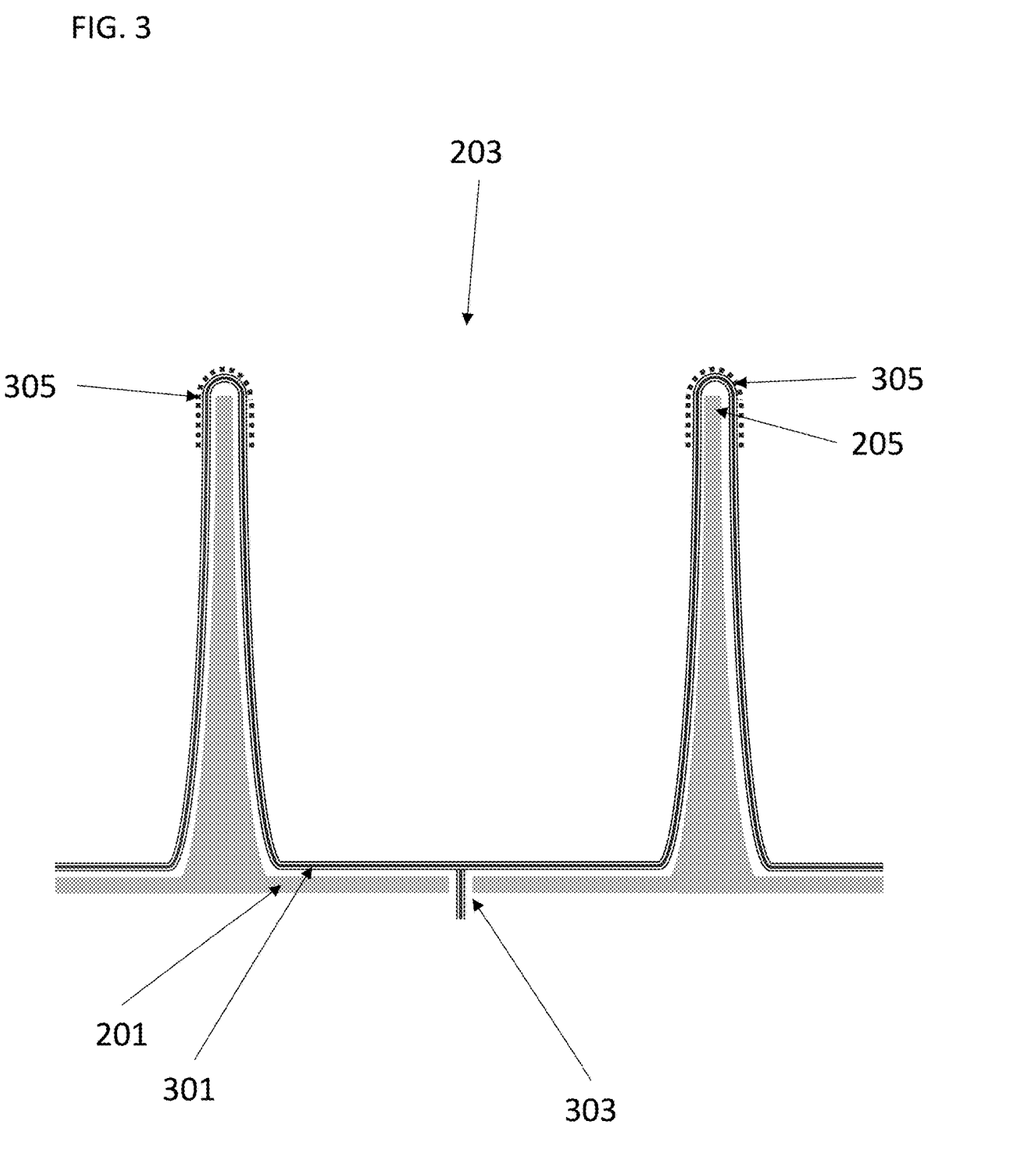
FIG. 3 is a cross section of a polymer base layer with cavities with a metal current collector.

Starting with the base layer 201, a battery cell can be formed by depositing very thin layers of material. With reference to FIG. 3, the first layer is the current collector for the anode 301. The current collector for the anode 301 is deposited over the surface of the base layer 201 coating the interior surfaces of the pores and the lip of the pores with a continuous layer of conductor. The process for depositing the conductor for the current collector can be tuned to deposit more conductor in the bottom of the cavity and to avoid the lip 205. The greater the thickness of the conductor deposit, the lower electrical resistance, the greater the attraction to lithium ions. Depositing a thicker layer at the bottom of the cavity encourages the lithium ions to travel to the bottom of the cavity before plating out as lithium metal.

The deposited conductor material for the current collector for the anode 301 can be Cu, Ni, Ti, TiN, graphene, or other various conductive metal oxides or nitrides or a conductive polymer. The current collector for the anode 301 can be deposited using known methods such as: electroless deposition, electroless deposition followed by electrodeposition, ALD (atomic layer deposition), PVD (physical vapor deposition), CVD (chemical vapor deposition), and others. The anode current collector 301 can be connected to external circuits at the edge of the base layer according to known techniques. Alternatively, a selected few of the cavities can be punctured at the bottom so that the deposition of the current collector for the anode 301 will bleed through the puncture 303 to permit an electrical connection on the back side of the base layer 201 between the current collector for the anode 301 and an external circuit.

Another way to form the current collector and the polymer sheet is to create a polymer sheet infused with graphene. In the case, the starting polymer layer is already conductive and the subsequent conductive layer may be optionally applied to further improve conductivity. In this case, care must be taken to electrically isolate the polymer sheet when it is packaged. As an additional alternative, a very thin polymer sheet can be layered with another polymer layer infused with graphene. A subsequent conductive layer may be optionally applied to further improve conductivity.

In operation, during a charging cycle, lithium ions will be reduced with an electrons from the anode current collector 301 causing the resulting lithium atoms to form a layer of lithium metal on the anode current collector 301. Most of this lithium metal will form in the walls and the bottom of each cavity 203. A small portion of the lithium metal may form on the anode current collector 301 at the lip 205 between the cavities. To further promote formation of lithium metal on the inner portion of each cavity 203, an optional layer of insulating material 305 can be deposited on the anode current collector 301 at the lip of the cavities. The insulating layer can be made of various high dielectric polymers such as Paralyne and can be deposited using ALD and other known methods of deposition of such thin layers. The insulating layer will prevent electrons from reducing lithium ions on the lip of the cavities 203.

Figure 4A:
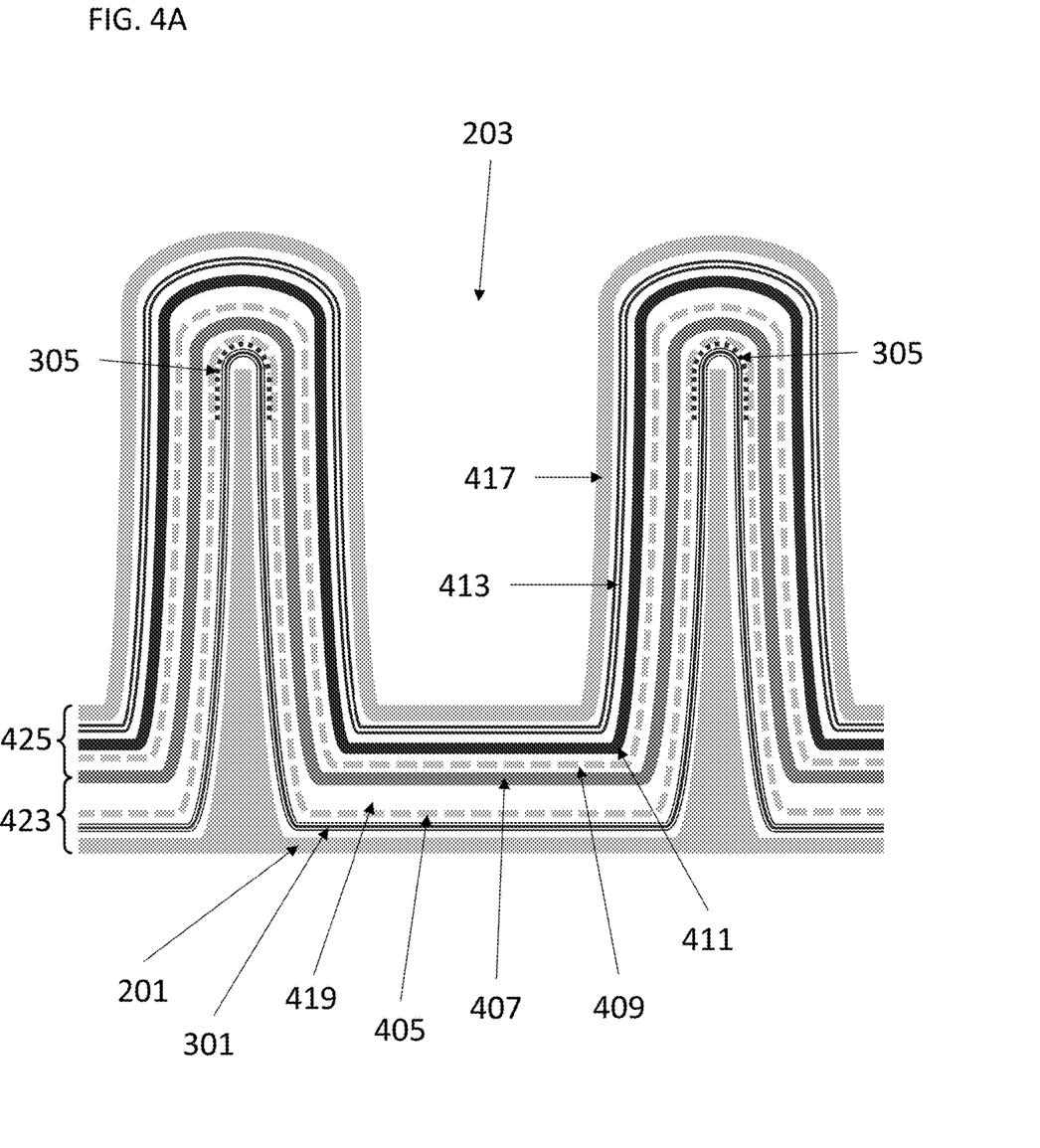
FIG. 4A is a cross section of the layers of a single cell without lithium metal deposited.

With reference to FIG. 4A, the anode current collector 301 is then coated with a thin layer of liquid electrolyte 405, 10 to 100 nanometers thick. Suitable liquid electrolytes include standard electrolytes used in lithium ion batteries such as LiPF6 in a suitable organic solvent such dimethyl carbonate, ethylene carbonate, or propylene carbonate.

To complete the anode 423 of the cell, a layer of solid electrolyte 407, 10-100 nanometers thick, preferably 20-30 nanometers, is applied. A first way to apply the solid electrolyte layer 407 is using atomic layer deposition or solution phase. The application of solid electrolyte is tuned so that a void 419 is left between the thin liquid electrolyte layer and the solid electrolyte at the bottom of each cavity.

The purpose of the void is to provide space for the lithium metal to collect when it deposits on the current collector during charging. The void 419 can be as almost as much as the depth of the cavity 203, minus the thickness of the current collector 301 and electrolyte 407 layers. For a single cell, the solid electrolyte 407 can stretch over the cavity opening, but not tightly and with a slight slumping towards the bottom of the cavity 203, so that the resulting void is 80-90% of the cavity volume for a single cell. It is important that the solid electrolyte 407 is not too tight because it needs to flexibly accommodate the change in volume of the lithium metal.

Figure 4B:
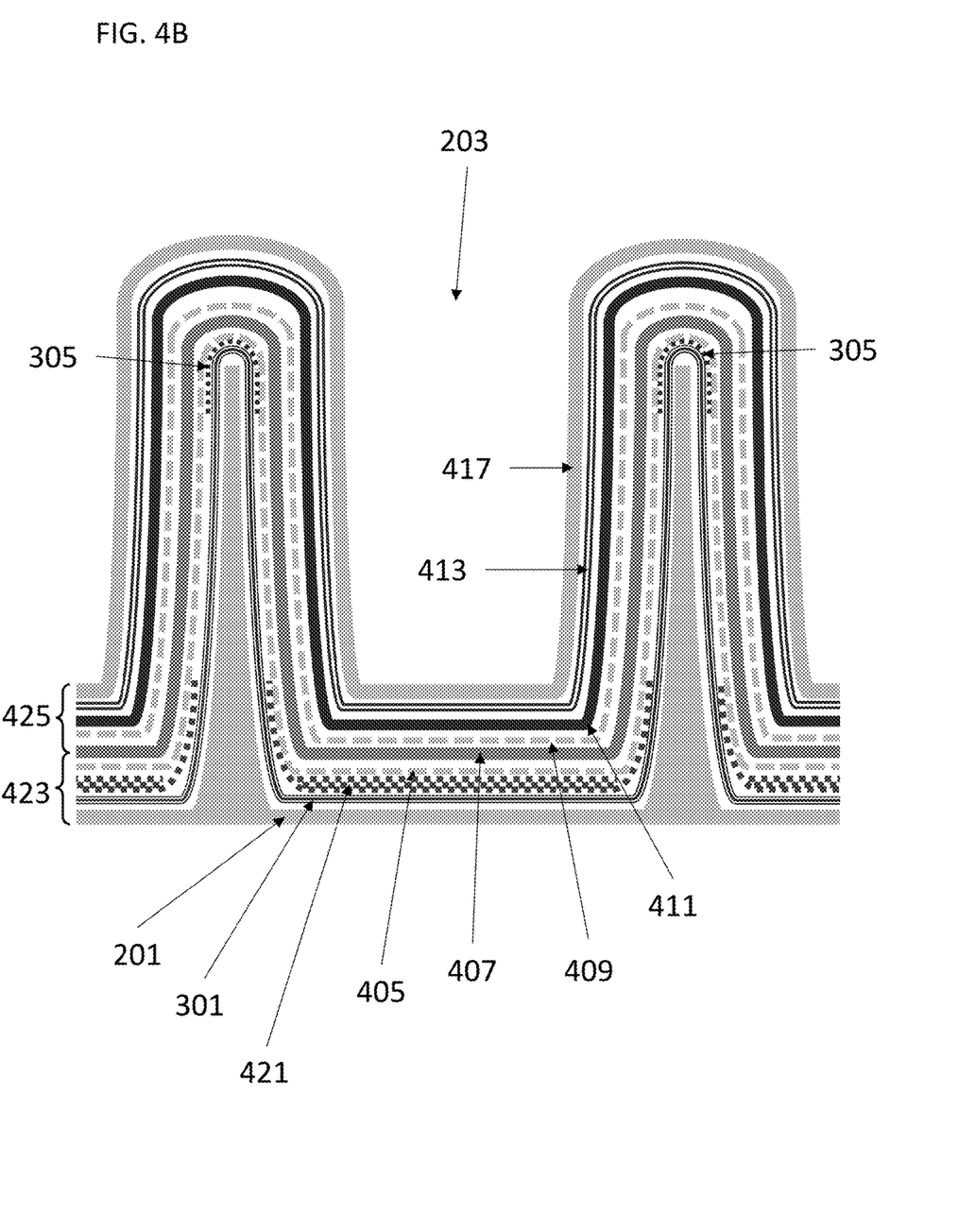
FIG. 4B is a cross section of the layers of a single cell with lithium metal deposited.

Another way of manufacturing the cell is to first deposit the current collector 301, then deposit lithium metal 421 at the bottom of each cell on the current collector as illustrated in FIG. 4B. The amount of lithium 421 depends on the design of the cell, e.g., whether it is a single or multiple cell. The amount of lithium 421 deposited can vary from 10% to 90% of the volume of the cavity 203. Following deposition of the lithium metal 421, it is coated with a thin layer of liquid electrolyte 405, 10 to 100 nanometers thick. To complete the anode 423 of the cell, a layer of solid electrolyte 407, 10-100 nanometers thick, preferably 20-30 nanometers, is applied. In this case, the solid electrolyte 407, is deposited without creating a void, because the lithium metal is already present.

For multi-cell assemblies, each next cell going inside the previous, each anode void 419 could be from 10-50% of the cavity depth, depending on the number of cells. The void 419 provides space for lithium metal to plate out on the current collector and fill the void during charging. The solid electrolyte 407 may also be applied using other known methods such as sol-gel, screen printing, spin coating, hot pressing, and magnetron sputtering. An alternative method is to place a sheet of solid electrolyte 407 over the assembly and indent the sheet of solid electrolyte 407 by pressing down with a die 103 to deform the solid electrolyte 407 to follow the contour of the cavities while leaving a void at the bottom of the cavity between liquid electrolyte and solid electrolyte. This and other steps in the process of forming a cell may be done under a vacuum to avoid trapping air between the layers.

The solid electrolyte 407 may be selected from the following types or families of electrolyte products including, but not limited to: sodium super ionic conductor (NASICON), garnet $Li_7La_3Zr_2O_{12}$ (LLZO), crystalline perovskite type lithium lanthanum titanate ($Li_{0.5}La_{0.5}TiO_3$) (LLTO), lithium super ionic conductor ($Li_{2+2x}Zn_{1-x}GeO_4$) (LISICON), LiPON $Li_2PO_2N$, $Li_3N$, sulfide, argyrodite, and antiperovskite.

Alternatively, the anode can be constructed starting with a flat sheet of thin polymer 101 and depositing the current collector layer 301, liquid electrolyte layer 405, and solid electrolyte layer 407 in sequence according to the methods described above. Then the assembly of anode layers 101, 301, 405, and 407 is then indented to create cavities 203. The void 419 between the liquid electrolyte layer 405 and solid electrolyte layer 407 in each cavity 203 would be achieved though impinging and retracting the tool. Due to the different moduli of elasticity between the substrate polymer material and the solid electrolyte material a void is created between the liquid 405 and solid electrolyte 407. In other words, the polymer substrate, along with the current collector will tend to retain the deformed shape due to the impingement, whereas the indents in the solid electrolyte layer will tend to spring back somewhat from the impingement leaving voids between the liquid and solid electrolyte at each cavity 203. The inserted cathode is then formed by additional layers deposited in each cavity 203.

With reference to FIGS. 4A and 4B, the cathode 425 is formed by adding layers on top of the solid electrolyte 407. First, a thin 10 to 100 nanometer cathode-side layer of liquid electrolyte 409 may be deposited over the solid electrolyte 407. The cathode-side layer of liquid electrolyte 409 is optional and may not be required depending on the other materials used to enable the migration of lithium ions between the anode current collector 301 and the cathode active mass 411. The layer of cathode liquid electrolyte 409 is deposited in the same ways that the anode side liquid electrolyte 405 was dispensed.

Next, the cathode active mass 411 is deposited by methods known to those skilled in the art. The cathode active mass 411 can be made from known materials for lithium batteries including, but not limited to: lithium cobalt oxide (LCO), lithium manganese oxide (LMO), lithium iron phosphate (LFP), lithium aluminum oxide, lithium nickel manganese cobalt oxide (NMC), and lithium nickel cobalt aluminum oxide (NCA).

In the case where the anode 423 was constructed with a void 419, the active cathode material contains the lithium for the battery cell, loosely bonded in the cathode active mass 411. During initial charging, lithium in the cathode active mass 411 will migrate to the anode and where it is reduced with electrons to form a lithium metal layer on the anode current collector 301. In the case where the anode 423 was constructed with a deposit of lithium metal 421 on the current collector 301, the active cathode material will only contain a small amount of lithium necessary to maintain stability.

Following the cathode active mass 411, the cathode current collector 413 is deposited on the active cathode layer 411. The cathode current collector 413 may be deposited by atomic layer deposition, electroless metal deposition, electrodeposition, and other methods know to those skilled in the art. Common materials for the cathode current collector are aluminum, nickel, graphene, or other various conductive metal oxides or nitrides or a conductive polymer. An electrical connection is made at the edges of the layer using typical methods known to persons of skill in the art.

If just a single cell battery is the design objective, the cell can be finished with top layer 417, made of a thin layer of thin polymer sheet, of the same material as the base material 201. The top layer 417 may be made of polyethylene, polypropylene, polytetrafluorethylene, polyvinyldene fluoride, polyethersulfone, or other similar materials. The top layer 417 may be deposited by vapor, plasma deposition, chemical vapor deposition and other methods known to those skilled in the art at a thickness of 120-150 microns.

Figure 5:
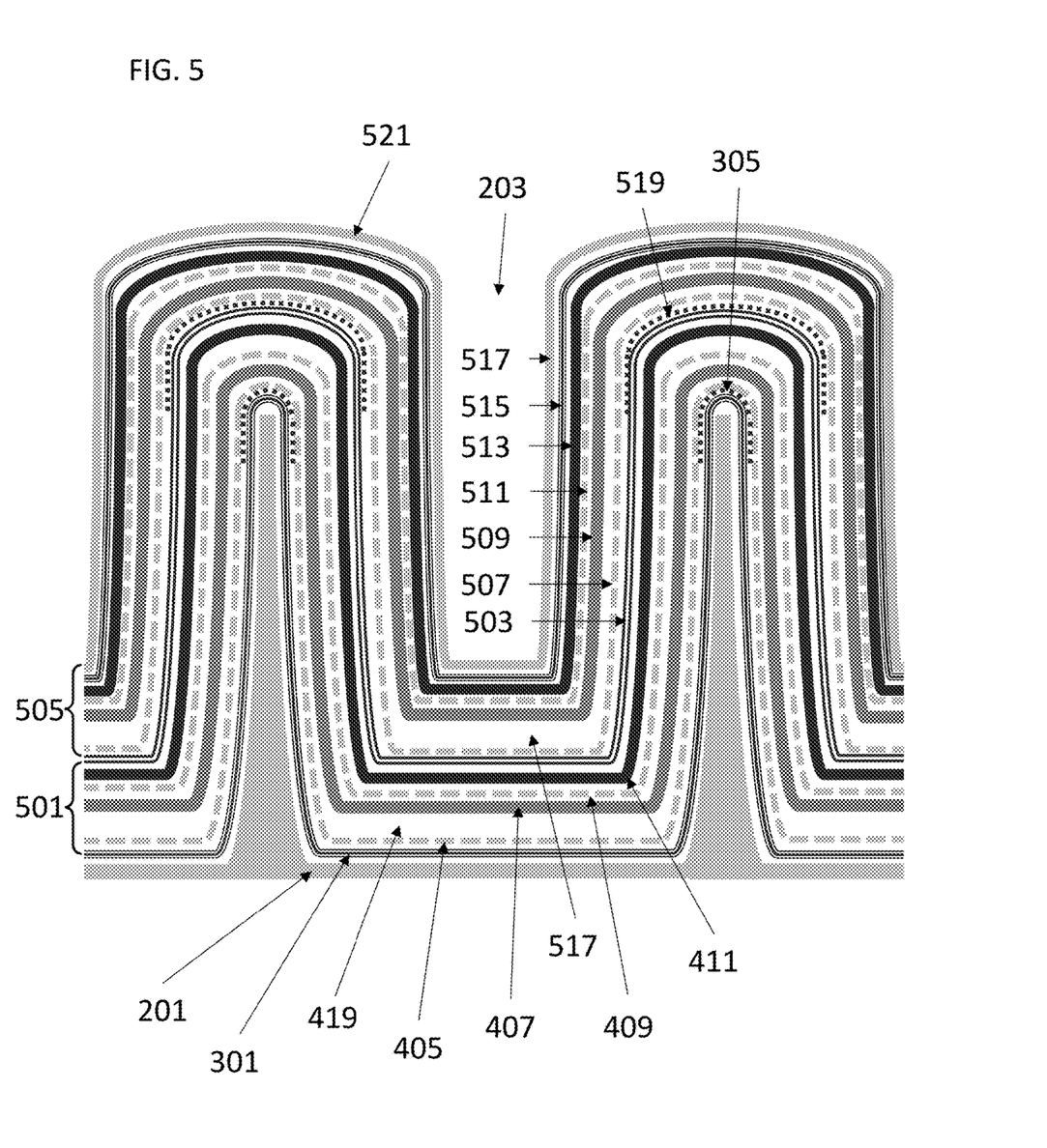
FIG. 5 is a cross section of the layers of two cell series.

With reference to FIG. 5, multiple cells can be inserted on the first cell 501 by repeating the sequence of laying down thin layers in the same sequence as for the first cell 501. For cells in series, the cathode current collector 413 of the first cell 501 becomes a bipolar electrode 503 that connects the first cell 501 in series with the second cell 505. To form the second cell, layers of a second anode liquid electrolyte 507 and a second solid electrolyte layer 509 are deposited with a void 517. Alternatively, just as with the first cell, instead of creating a void for the lithium metal, lithium metal could be deposited on top of the bipolar electrode 503 followed by the second solid electrolyte layer 509 without a void. Next, an optional second cathode liquid electrolyte layer 511, a second cathode active mass 513, and a cathode current collector 515 are deposited to form the second cell 505 in the same way that they were deposited for the first cell 501. The surfaces of the bipolar electrode 503 that are not in the cavity can be protected with a polymer insulator 519 to inhibit the formation of lithium metal outside of the cavity.

This process of layering cells on top of cells can be repeated a number of times to create a number of cells in series. Each intermediate electrode adjacent to a cathode active mass serves as a bipolar electrode such as the bipolar electrode 503 shown in FIG. 5. When the top, i.e., the last cell in the stack is deposited, the electrode adjacent to a cathode active mass serves as the cathode current collector such as the cathode current collector 515 shown in FIG. 5 for a two-cell configuration. The top cell in the stack is then finished with a top layer 521, made of a thin layer of polymer sheet, of the same sort of material as the base material 401. The top layer 521 may be made of polyethylene, polypropylene, polytetrafluoroethylene, polyvinyldene fluoride, polyethersulfone, or other similar materials. The top layer 517 may be deposited by same methods described above at a thickness of 120-150 μM.

Figure 6:
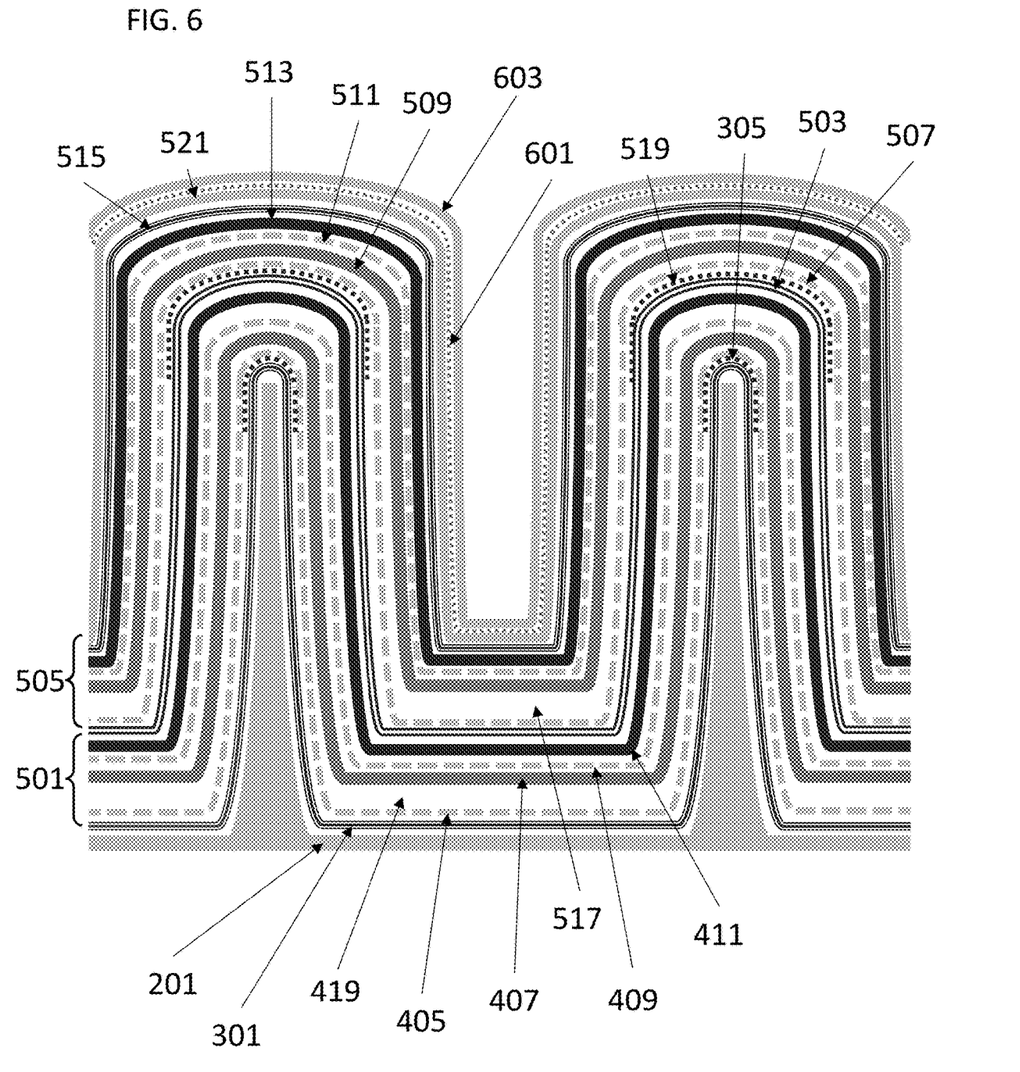
FIG. 6 is a cross section of an alternate embodiment of the layers of two cells in series.

Then the top of the stack of cells is finished with a top layer 521, made of a thin layer of polymer sheet, of the same sort of material as the base material 401. The top layer 521 may be made of polyethylene, polypropylene, polytetrafluorethylene, polyvinyldene fluoride, polyethersulfone, or other similar materials. The top layer 521 may be deposited at a thickness of 120-150 μm. Optionally, to facilitate heat transfer for cooling, a heat conducting liquid 601 can be deposited between polymer layers 521 and 603 improve the transfer of the heat generated by the operation of the battery out of the stack of cells as shown in FIG. 6. The heat transfer liquid can be water or other fluid with good heat transfer properties. Polymer layer 603 can then be the base layer for stacking additional cells in the same manner.

Figure 7:
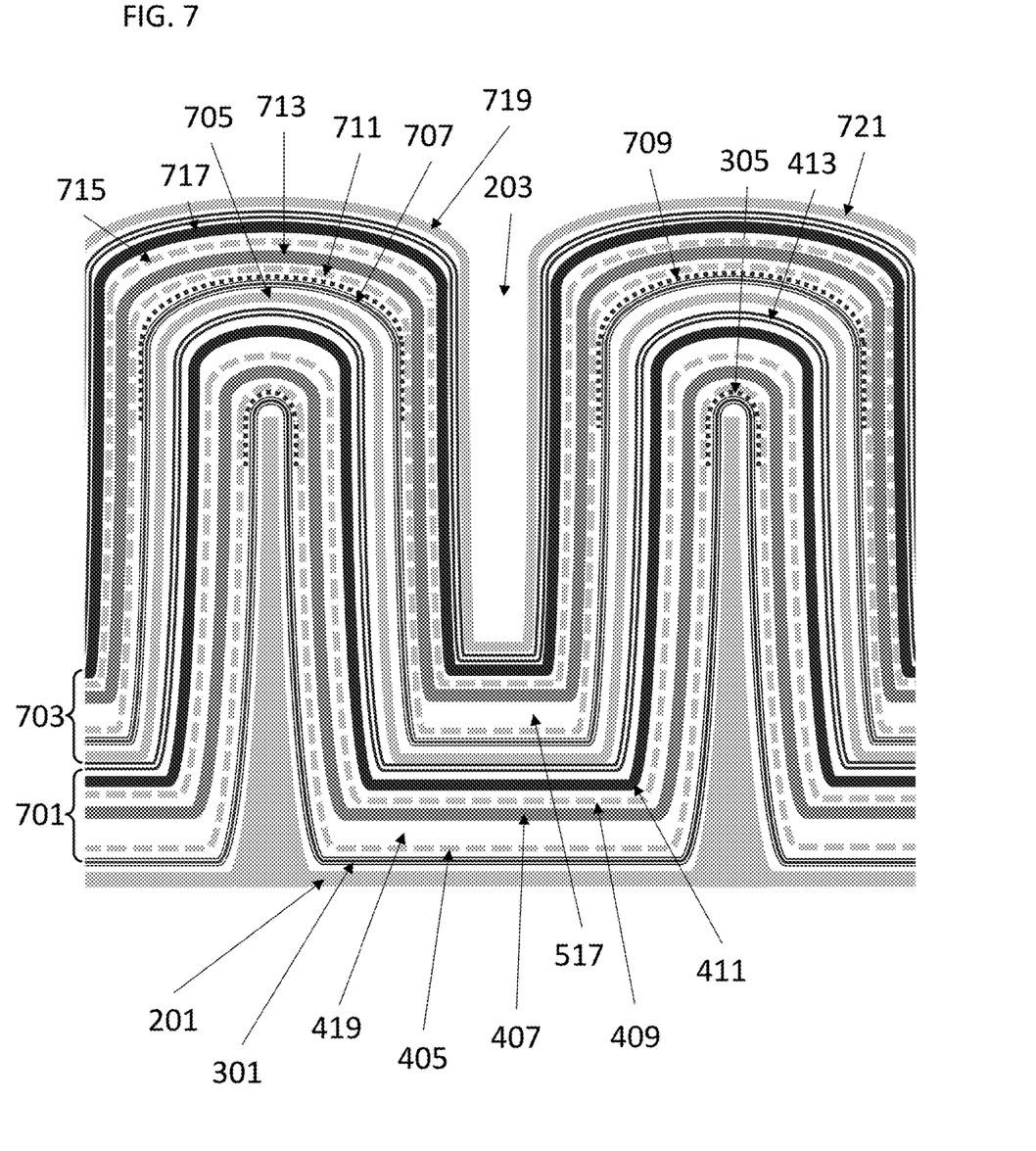
FIG. 7 is a cross section of the layers of two cells in parallel.

Alternatively, the cells can be stacked in parallel, each cell separated by a thin polymer sheet to electrically isolate each cell. As shown in FIG. 7, a second parallel cell 703 can be deposited over a first cell 701. The conductive layer adjacent to the cathode active mass is the cathode current collector 413. The first cell is electrically isolated from the second parallel cell 703 with a layer of polymer 705. The layers for the second cell 703 are then deposited using the same techniques as described above. A second anode current collector 707 is deposited on the layer of polymer 705. Optionally, a layer of polymer material to function as an insulator 709 is deposited on the portion of the stack that it not in the cavity. A thin layer of liquid electrolyte for the second cell 711 is deposited on top of the anode current collector 707 and the insulator 709. Next, a layer of solid electrolyte 713 is deposited with a void 517. Alternatively, lithium metal is deposited in lieu of the void 517. Optionally, another layer of liquid electrolyte 715 is deposited on the cathode side of the solid electrolyte 713. A layer of cathode active mass 717 is then deposited, followed by a layer of cathode current collector 719. To finish two parallel cells a layer of polymer 721 is deposited.

A battery according to the above description has one or more cells. The specific design of the inserted cavity electrode battery for variables such as the number of cells, and whether the cells are constructed in series or parallel, the overall size of the sheet, etc. is determined by the application according to known tradeoffs in battery design between characteristics such as power, capacity, and weight.

Figure 8:
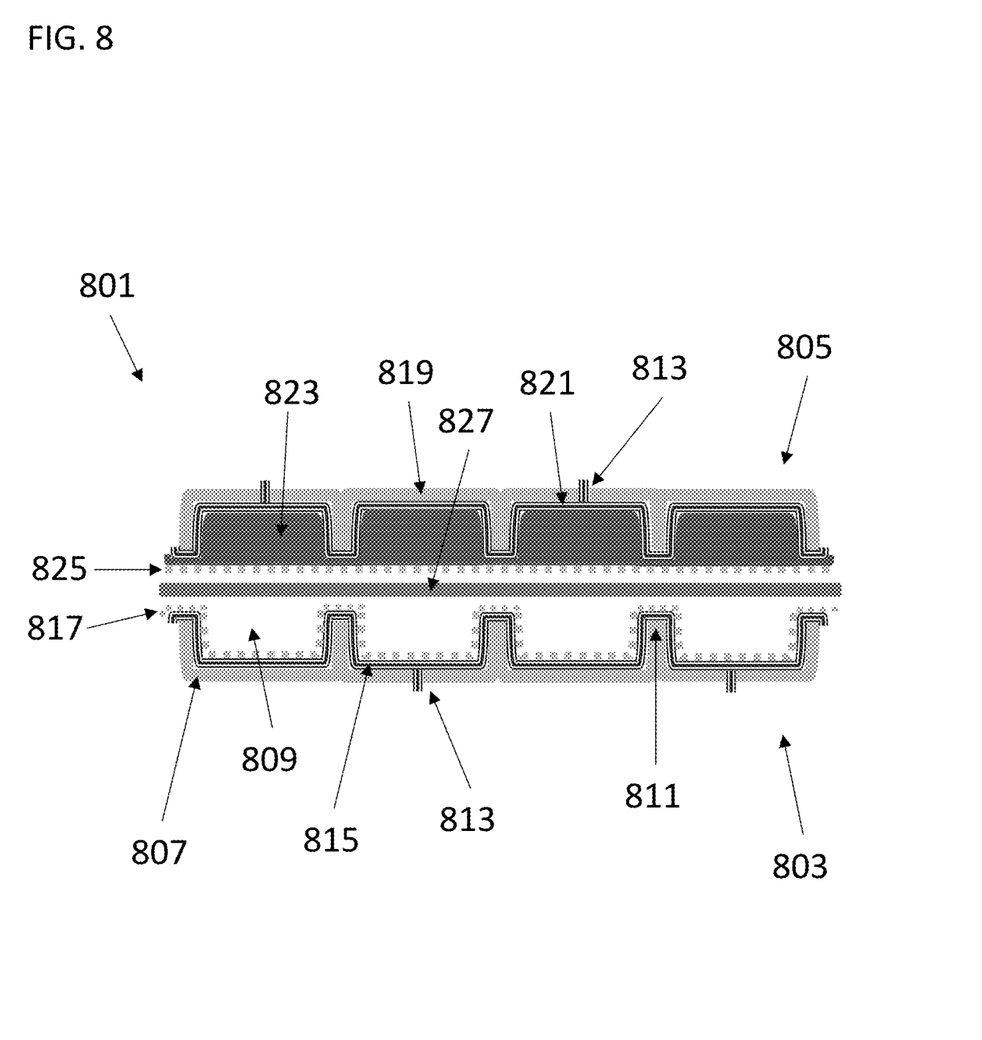
FIG. 8 is a cross section of a single cell with opposing minor image electrodes.

An alternative embodiment to stacking cells in cavity-convexity scheme is to create a battery cell 801 minor image electrodes as shown in FIG. 8. The anode 803 is formed using a thin polymer base layer 807 with an array of cavities 809. The cavities 809 in the thin polymer base layer 807 are formed as described above from a thin polymer sheet 101. The thin polymer base layer 807 may be made of polyethylene, polypropylene, polytetrafluorethylene, polyvinyldene fluoride, polyethersulfone, or other similar materials. The cavities 809 can have a square-like or round-like shapes depending on the desired pattern. The cavities 809 can be arranged in any manner such as in rows and columns or in a honeycomb fashion. The cavities 809 may be sized to be 120 to 150 microns deep, and from 10-100 microns wide, typically 20-30 microns wide. The lip 811 between the cavities 809 may be 1-5 μm thick.

The current collector for the anode 815 is deposited over the surface of the base layer 807 coating the interior surfaces of the pores and the lip of the pores with a continuous layer of conductor that is 10-100 nm thick, preferably 20-30 nm thick. The conductor deposited for the current collector can be tuned to deposit more metal in the bottom of the cavity. The greater the thickness of the metal deposit, the lower electrical resistance, the greater the attraction to lithium ions. Depositing a thicker layer at the bottom of the cavity encourages the lithium ions to travel to the bottom of the cavity before plating out at lithium metal.

The deposited conductive material for the current collector for the anode 803 can be Cu, Ni, Ti, TiN, graphenea or other various conductive metal oxides or nitrides. The current collector for the anode 803 can be deposited using known methods such as: electroless deposition followed by electrodeposition, ALD (atomic layer deposition), PVD (physical vapor deposition), CVD (chemical vapor deposition), and others. The bottom of a selected number of cavities 809 are punctured to create a puncture opening 813 at the bottom of the cavities 809 so that the deposition of the current collector for the anode 301 will bleed through the puncture 813 to permit an electrical connection on the back side of the base layer 807 between the current collector for the anode 803 and an external circuit.

The concave anode current collector 815 is then coated with a thin layer of liquid electrolyte 817, 10 to 100 nm thick. Suitable liquid electrolytes include standard electrolytes used in lithium ion batteries such as LiPF6 in a suitable organic solvent such dimethyl carbonate, ethylene carbonate, or propylene carbonate.

The cathode 805 is similarly formed with a cathode base layer 819 having punctures 813, and a cathode current collector 821. The cathode current collector 821 may be deposited by atomic layer deposition, electroless metal deposition, electrodeposition, and other methods know to those skilled in the art. Common metals for the cathode current collector 821 are aluminum or nickel. Electrical connections to the cathode current collection 821 are made on the back side of the cathode base layer 819 to the current collector metal that bleeds through the puncture 813.

The cathode current collector 821 is then coated with a layer of cathode active mass 823. The cathode active mass 823 can be made from known materials for lithium batteries including, but not limited to: lithium cobalt oxide (LCO), lithium manganese oxide (LMO), lithium iron phosphate (LFP), lithium aluminum oxide, lithium nickel manganese cobalt oxide (NMC), and lithium nickel cobalt aluminum oxide (NCA). These active cathode materials contain the lithium for the battery cell, loosely bonded in the cathode active mass 823. During initial charging, lithium in the cathode active mass 823 will migrate to the anode and where it is reduced with electrons to form a lithium metal layer on the anode current collector 815.

A thin 10 to 100 nm layer of a second layer of liquid electrolyte 825 is deposited over the cathode active mass

823. The cathode layer of liquid electrolyte 825 may be deposited in the same ways that the anode side liquid electrolyte 817 is dispensed.

The anode 803 and cathode 805 are then sandwiched together separated by a layer of solid electrolyte 827. The solid electrolyte 827 may be selected from the following types or families of electrolyte products including, but not limited to: sodium super ionic conductor (NASICON), garnet $Li_7La_3Zr_2O_{12}$ (LLZO), crystalline perovskite type lithium lanthanum titanate ($Li_{0.3}La_{0.3}TiO_3$) (LLTO), lithium super ionic conductor ($Li_{2+2x}Zn_{1-x}GeO_4$) (LISICON), LiPON $Li_2PO_2N$, $Li_3N$, sulfide, argyrodite, and antiperovskite.

There are some recent anode materials that involve silicate or LiSi alloys and TiO2 mixed with lithium. These materials can also be used with the disclosed battery design as anode active masses in addition to lithium metal. The inserted cavity electrode lithium battery structure will provide improved environment for these anode chemistries as well. For example, the most serious problem with silicon anode (LiSi) is extraordinary expansion and contraction during cycling, as lithium goes in and out of the anode. These large variations of volume over time create mechanical instability and lead to loss in cycle life. By using the inserted cavity electrode lithium battery structure, the reaction takes place inside the cavities, which contain the expansion and retain the shape and volume during contraction, providing thereby mechanical stability to the electrode and longer cycle life.

Multicell batteries, with the cells wired either in parallel or series can be created using conventional methods used for lithium ion batteries. The final structure can be bent or rolled if necessary for assembly in a desired shape or to fit into a cylindrical cells such as conventional Li-ion battery cells 18650 or 21700, where the first two digits give the diameter and last three the length of a cylinder in millimeters.

What is claimed is:

1. A battery comprising:
   a deformed sheet of electrically non-conductive polymer base material;
   said deformed sheet having cavities, each with a bottom;
   an anode current collector layer directly on said deformed sheet;
   a layer of anode liquid electrolyte directly on said anode current collector layer;
   a layer of solid electrolyte on said layer of anode liquid electrolyte with a void at the bottom of said cavities between the solid electrolyte and the current collector;
   a cathode active mass layer; and
   a cathode current collector.

2. The battery of claim 1 further comprising:
   some of said cavities are punctured.

3. The battery of claim 1 further comprising:
   each said cavity having a lip;
   a layer of electrically insulating material on said anode current collector at the said lip of each said cavity.

4. The battery of claim 1 further comprising:
   a layer of cathode liquid electrolyte between said solid electrolyte and said cathode active mass.

5. The battery of claim 1 further comprising:
   a top electrically non-conductive polymer layer.

6. The battery of claim 5 further comprising:
   a heat conducting liquid between said cathode current collector and said top non-conductive polymer layer.

* * * * *